(12) United States Patent
He

(10) Patent No.: US 11,119,231 B2
(45) Date of Patent: Sep. 14, 2021

(54) METHOD FOR STRUCTURE MODEL BUILDING

(71) Applicant: SHELL OIL COMPANY, Houston, TX (US)

(72) Inventor: Dian He, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 123 days.

(21) Appl. No.: 16/743,020

(22) Filed: Jan. 15, 2020

(65) Prior Publication Data

US 2021/0215840 A1 Jul. 15, 2021

(51) Int. Cl.
*G01V 1/28* (2006.01)
*G01V 1/00* (2006.01)

(52) U.S. Cl.
CPC .............. *G01V 1/282* (2013.01); *G01V 1/003* (2013.01)

(58) Field of Classification Search
CPC ................................ G01V 1/282; G01V 1/003
See application file for complete search history.

(56) References Cited

U.S. PATENT DOCUMENTS

| | | | | |
|---|---|---|---|---|
| 7,280,918 | B2* | 10/2007 | Williams | G01V 1/282 702/14 |
| 8,498,845 | B2* | 7/2013 | Jing | G01V 3/38 703/2 |
| 9,383,475 | B2* | 7/2016 | MacGregor | G01V 3/38 |
| 9,702,997 | B2* | 7/2017 | Sava | G06T 7/20 |
| 10,295,683 | B2* | 5/2019 | Du | G01V 1/282 |
| 10,845,494 | B2* | 11/2020 | Zhao | G01V 1/366 |
| 11,041,971 | B2* | 6/2021 | Tang | G01V 1/30 |
| 2016/0341835 | A1* | 11/2016 | Guillaume | G01V 1/282 |
| 2018/0120464 | A1* | 5/2018 | Sun | G01V 1/48 |
| 2020/0003920 | A1* | 1/2020 | Tang | G01V 1/282 |
| 2020/0158898 | A1* | 5/2020 | Le Guern | G01V 1/282 |
| 2020/0183046 | A1* | 6/2020 | Wheelock | G06N 20/10 |
| 2020/0233111 | A1* | 7/2020 | Wheelock | E21B 49/00 |

OTHER PUBLICATIONS

Allmendinger, "Inverse and Forward Numerical Modeling of Trishear Fault-Propagation Folds", Tectonics, vol. 17, Issue No. 4, Aug. 1998, pp. 640-656.

(Continued)

*Primary Examiner* — Mohammad K Islam
(74) *Attorney, Agent, or Firm* — Shell Oil Company

(57) ABSTRACT

A method for generating a plurality of structural models for a geological setting involves identifying a poorly imaged portion of an input seismic data set. A set of geologically valid kinematic base models are selected to define a kinematic evolution scenario. A correspond set of kinematic base model parameters is defined for the models. A structural model is generated for both a well-imaged portion of the seismic data and the poorly imaged portion. A misfit between the input horizons and the and the modeled horizons is calculated and steps are repeated for a predetermined number of iterations to produce a best-fit model. The steps are repeated then to produce a plurality of best-fit models of geologically plausible solutions for the geological setting. The method is particularly suitable for complex geological settings.

7 Claims, 5 Drawing Sheets

(56) References Cited

OTHER PUBLICATIONS

Cardozo et al., "Optimized Trishear Inverse Modeling", Journal of Structural Geology, vol. 31, 2009, pp. 546-560.
Cardozo et al., "Determining the Uniqueness of the Best-fit Trishear Models", Journal of Structural Geology, vol. 33, 2011, pp. 1063-1078.
Brandenburg et al., "From Intuition to Statistics in Building Subsurface Structural Models", World Oil, vol. 232, Issue No. 6, 2011, pp. 97-101.

* cited by examiner

METHOD FOR STRUCTURE MODEL BUILDING

FIELD OF THE INVENTION

The present invention relates to the field of geological structure model building, and, in particular, to a method for generating a plurality of geologically plausible models for regions having poorly imaged seismic data.

BACKGROUND OF THE INVENTION

The maturation of exploration portfolios is leading to an increase in the proportion of structurally complex leads and prospects, such as subsalt and onshore fold-thrust belts. These structurally complex opportunities present higher risk and larger volumetric uncertainties. Seismic imaging of these leads and prospects is inherently poor because of their structural complexities and is commonly compounded by acquisition and processing challenges, for example, statics, surface coupling, and variable and poorly constrained velocities. Seismic data for these geological settings often includes portions that are well-imaged, as well as portions that are poorly imaged. Regions of poorly imaged data increase the uncertainty in interpretation and model building of a geological setting.

Accordingly, techniques have been developed for reducing structural uncertainty. Conventional techniques involve manually creating single, nonunique, balanced cross sections using an iterative process. More specifically, the industry-standard solution for constraining the risks and uncertainties created by unimaged or poorly imaged complexities (as used hereinafter "poorly imaged" includes both poorly imaged and unimaged regions of a geological setting) is by manually balancing and palinspastically restoring key cross sections. However, this is a time-consuming task requiring specialist expertise. Moreover, many alternative and significantly different balanced interpretations of a single cross section are possible. As a result, alternative interpretations are rarely constructed because of their time-consuming nature. Even when more are created, there is no technology for identifying the best or most likely solution. Thus, the nonuniqueness issue is not addressed effectively and fold-thrust belt prospects are very high risk and have large volumetric uncertainties.

The shift from manual work to computational modeling began two decades ago. Allmendinger ("Inverse and forward numerical modeling of trishear fault-propagation folds" *Tectonics* 17:4:640-656; August 1998) first implements a computational approach to building a balanced cross section. Allmendinger uses a trishear fault-propagation folding kinematic algorithm to model a partially known structure and the grid search method to find a best-fit model. However, the grid search method is a "brute force" technique, which can only be used for modeling a simple structure with a few parameters.

Cardozo et al ("Optimized trishear inverse modeling" *Journal of Structural Geology* 31: 546-560; 2009) addresses the robustness, but also inefficiencies of grid searching and applying a gradient-based optimization algorithm to a similar trishear problem. As Cardozo et al explain: "Rather than systematically searching the parameter space for a minimum, the optimization algorithms traverse the parameter space in ideal directions towards a minimum, thus considerably reducing the time of search of the best-fit parameters."

In a later publication, Cardozo et al ("Determining the uniqueness of the best-fit trishear models" *Journal of Structural Geology* 33:1063-1078; 2011) disclosed that their earlier method (discussed above) had practical limitations on the maximum possible number of searches and no guarantees that the strategy would sample all local minima even if the initial estimates are closely spaced and regularly distributed. In the 2011 paper, a global optimization algorithm—simulated annealing—is applied to trishear inverse modeling. This algorithm is able to avoid trapping into local minima and, therefore, has higher chance to find the global minimum. By applying the simulated annealing optimization, Cardozo et al also realized that the structure problems to be solved often have a number of non-unique solutions, which are all equally fit to the existing data well.

Similarly, Brandenburg et al ("From intuition to statistics in building subsurface structural models" *World Oil* 97-101; June 2011) implement a similar global optimization algorithm with trishear forward modeling to apply to a few subsurface structure problems with partially imaged seismic data.

Conventional methods, i.e., manual work, are time-consuming. Recent advances on computational modeling considerably reduce the time of structural model construction. However, the computation-based approaches developed in the past two decades focus only on modeling simple trishear-type structures. Generally, these methods are a proof-of-concept type of demonstration of combining optimization algorithms with computation-based structural model building.

There is a need to develop a robust methodology for rapidly generating geological plausible structural models for poorly imaged geological settings with complex structures (more than just simple structures) and different structural styles (more than just trishear).

SUMMARY OF THE INVENTION

According to one aspect of the present invention, there is provided a method for generating a plurality of structural models for a geological setting, the method comprising the steps of: (a) providing a seismic data set for the geological setting, the data set having a well-imaged portion and a poorly imaged portion; (b) identifying a region of the poorly imaged portion of the seismic data set; (c) providing input horizons for the well-imaged portion of the seismic data set; (d) defining a kinematic evolution scenario by selecting a set of geologically valid kinematic base models; (e) defining a set of kinematic base model parameters for the kinematic base models; (f) generating a structural model with horizons for the well-imaged portion and the poorly imaged portion of the geological setting based on the set of kinematic base model parameters; (g) calculating a misfit between the input horizons and the horizons for the structural model; (h) running steps (f) and (g) for a predetermined number of iterations to produce a best-fit model; (i) repeating steps (d) to (h) to produce a plurality of best-fit models of geologically plausible solutions for the geological setting; and (h) ranking the plurality of best-fit models.

BRIEF DESCRIPTION OF THE DRAWINGS

The method of the present invention will be better understood by referring to the following detailed description of preferred embodiments and the drawings referenced therein, in which.

DETAILED DESCRIPTION OF THE INVENTION

In accordance with the present invention, a plurality of best-fit models of geologically plausible solutions for a geological setting are produced and ranked. The method of the present invention is particularly applicable for structurally complex geological settings. The plurality of best-fit models can be produced rapidly.

Figure 1A:
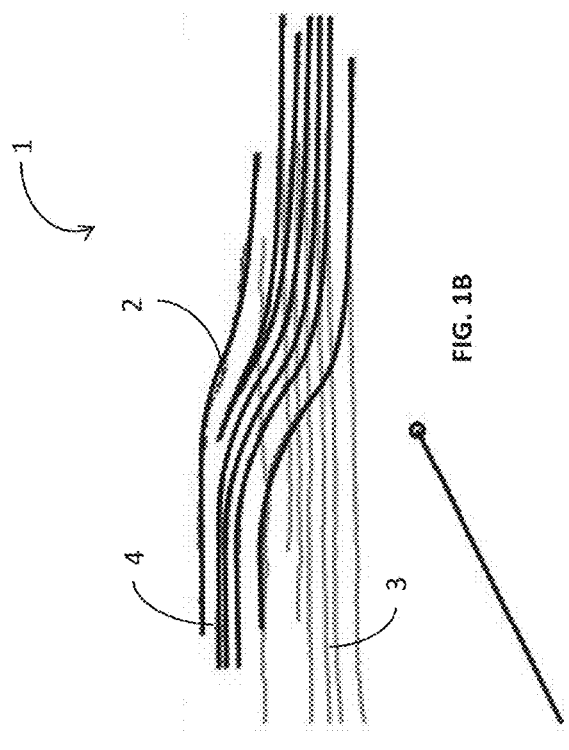
FIGS. 1A-1D is an example of a prior art result of structural modeling.
Figure 1B:
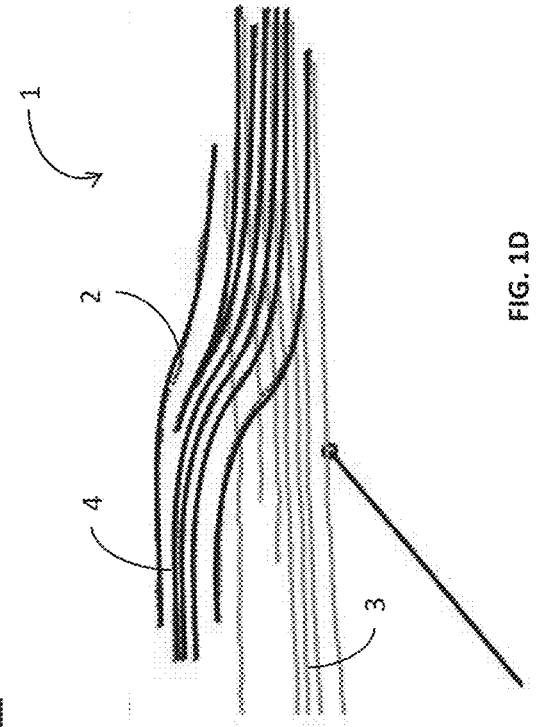
Figure 1C:
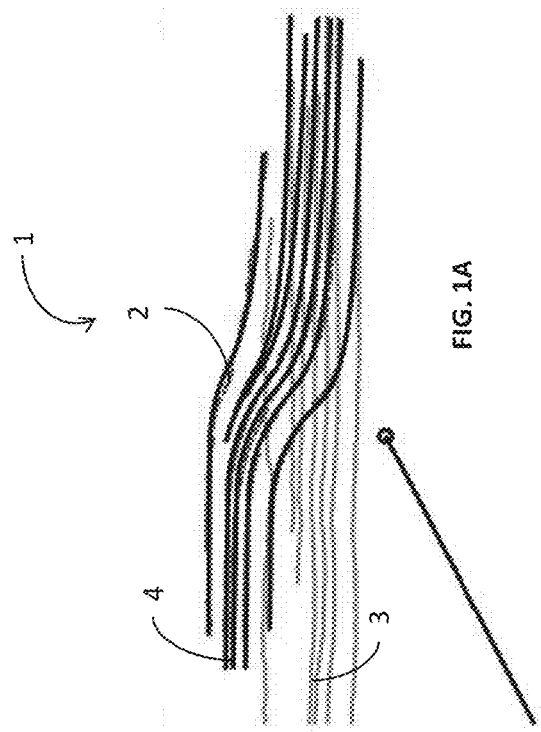
Figure 1D:
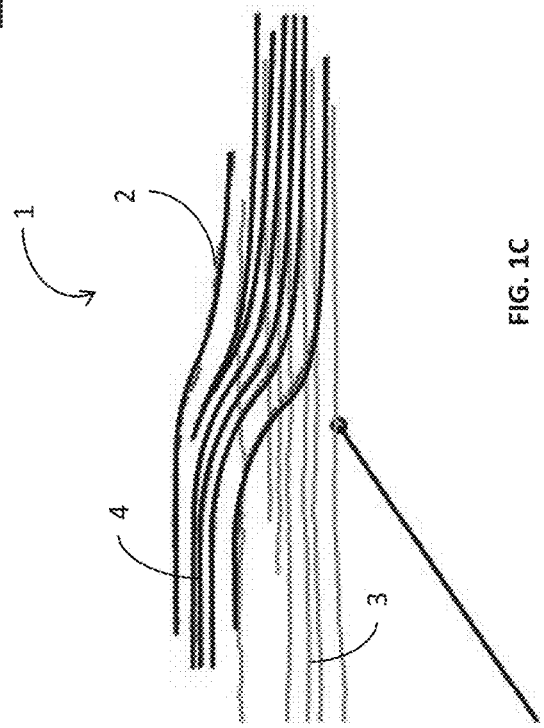

In order to better demonstrate the present invention, it is beneficial to review a prior art method. FIGS. 1A-1D illustrate a prior art structural model 1. Specifically, FIGS. 1A-1D are reproduced from Cardozo et al ("Determining the uniqueness of the best-fit trishear models" *Journal of Structural Geology* 33:1063-1078; 2011). Cardozo et al present results of a simulated annealing inversion for trishear parameters that best restore pre-growth beds. FIG. 1A is an example of a "low uplift" model (ramp=27°, P/S=2.0, TA=77°, slip=7.38 m, uplift=3.38 m). FIG. 1B is an example of an "intermediate uplift, low ramp angle" model (ramp=26°, P/S=2.1, TA=85°, slip=9.66 m, uplift=4.2 m). FIG. 1C is an example of an "intermediate uplift, high ramp angle" model (ramp=34°, P/S=2.47, TA=66°, slip=7.96 m, uplift=4.42 m). FIG. 1D is an example of a "high uplift" model (ramp=39°, P/S=3.87, TA=38°, slip=8.19 m, uplift=5.18 m).

The dotted lines in FIGS. 1A-1D represent the available bedding data 2. The set of substantially parallel lines represent the restored strata 3. The trishear models 4 are depicted by the sets of lines having curved portions. An initial estimate of parameters linked to the geometry and propagation history of a fault. A simulated annealing algorithm is applied to an optimized trishear inverse modeling strategy to generate models by randomly generating a new point in the parameter space in each iteration. The distance of the new point from the current point, or the extent of the search, is controlled by the temperature. As can be seen in FIGS. 1A-1D, the trishear models 4 generated by Cardozo et al generally have the same shape.

As shown in FIGS. 1A-1D, the geological setting is relatively simple. It is believed that the Cardozo et al method is not robust enough for more complex geological settings, such as fold-thrust belt structures.

The method of the present invention transforms time-consuming manual workflow into a faster automated process requiring much less human intervention. It enables the construction of a range of balanced cross sections and, therefore, quantification of structural uncertainty by testing multiple alternative structural models. The present invention allows for the construction of balanced cross sections more efficiently through full utilization of computational power and fewer interactions between users and computers.

Specifically, the method of the present invention generates a fairly large number (tens of thousands) of kinematically feasible, but not necessarily geologically feasible, models; and selects a plurality of best-fit (kinematically and geologically feasible) models that match the existing data using stochastic optimization techniques. A plausible model honors available data (seismic, wells and surface geology) and obeys physical laws of geometry, kinematics and geology.

Figure 2:
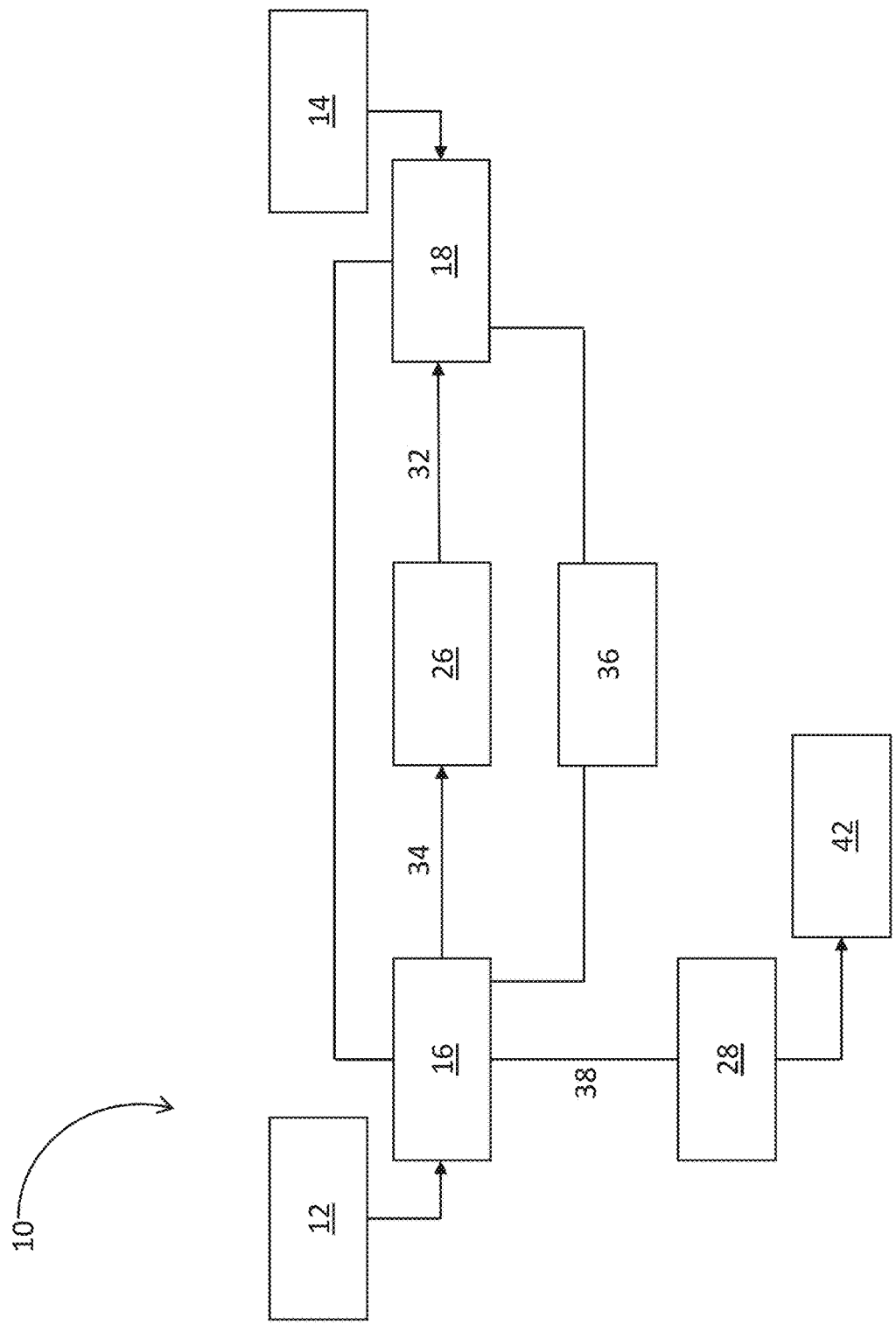
FIG. 2 is a block diagram illustrating an embodiment of the method of the present invention.
Figure 3:
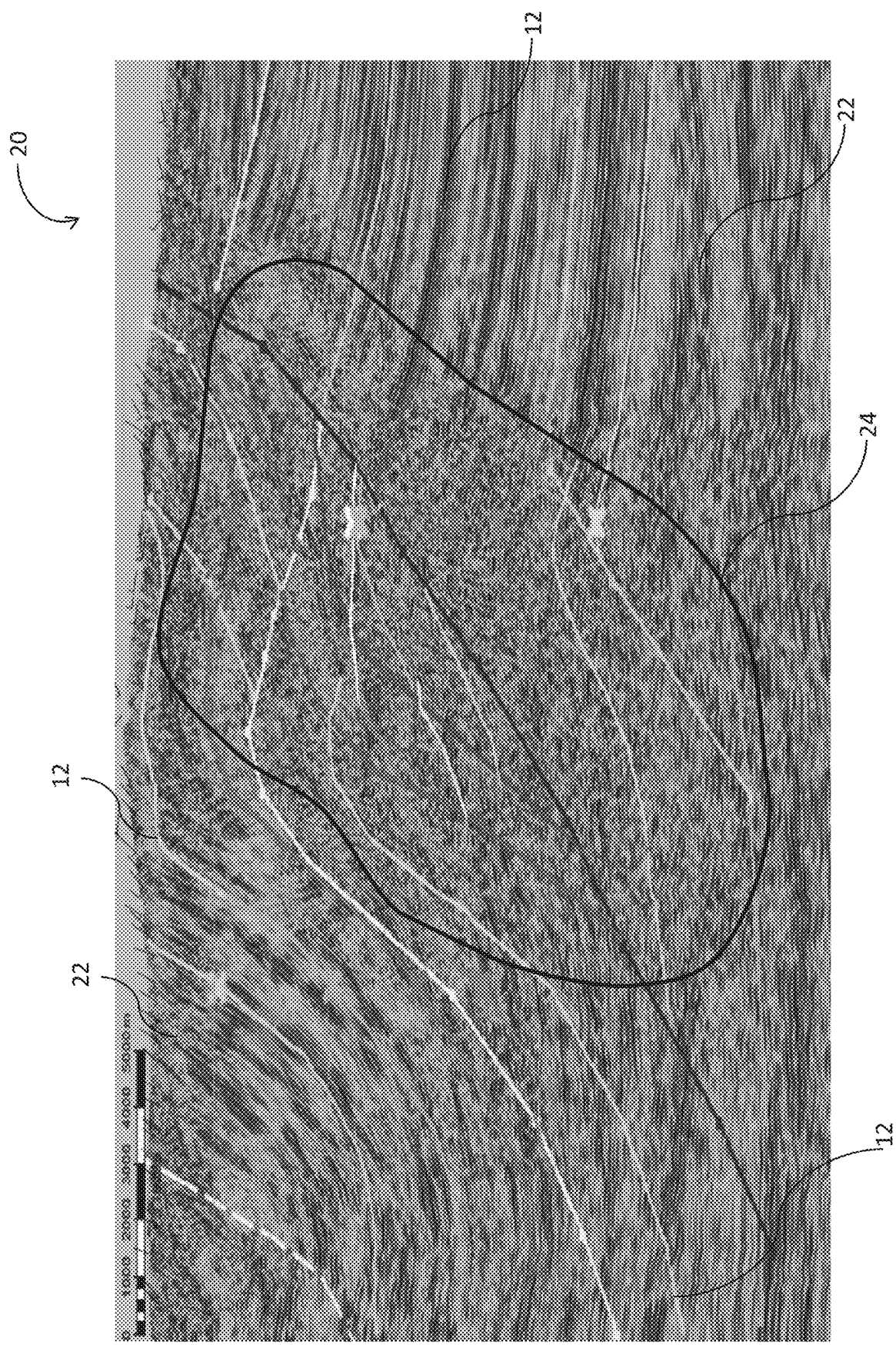
FIG. 3 is an image of seismic data for a geological setting, the seismic data having a well-imaged portion and a poorly-imaged portion.
Figure 4:
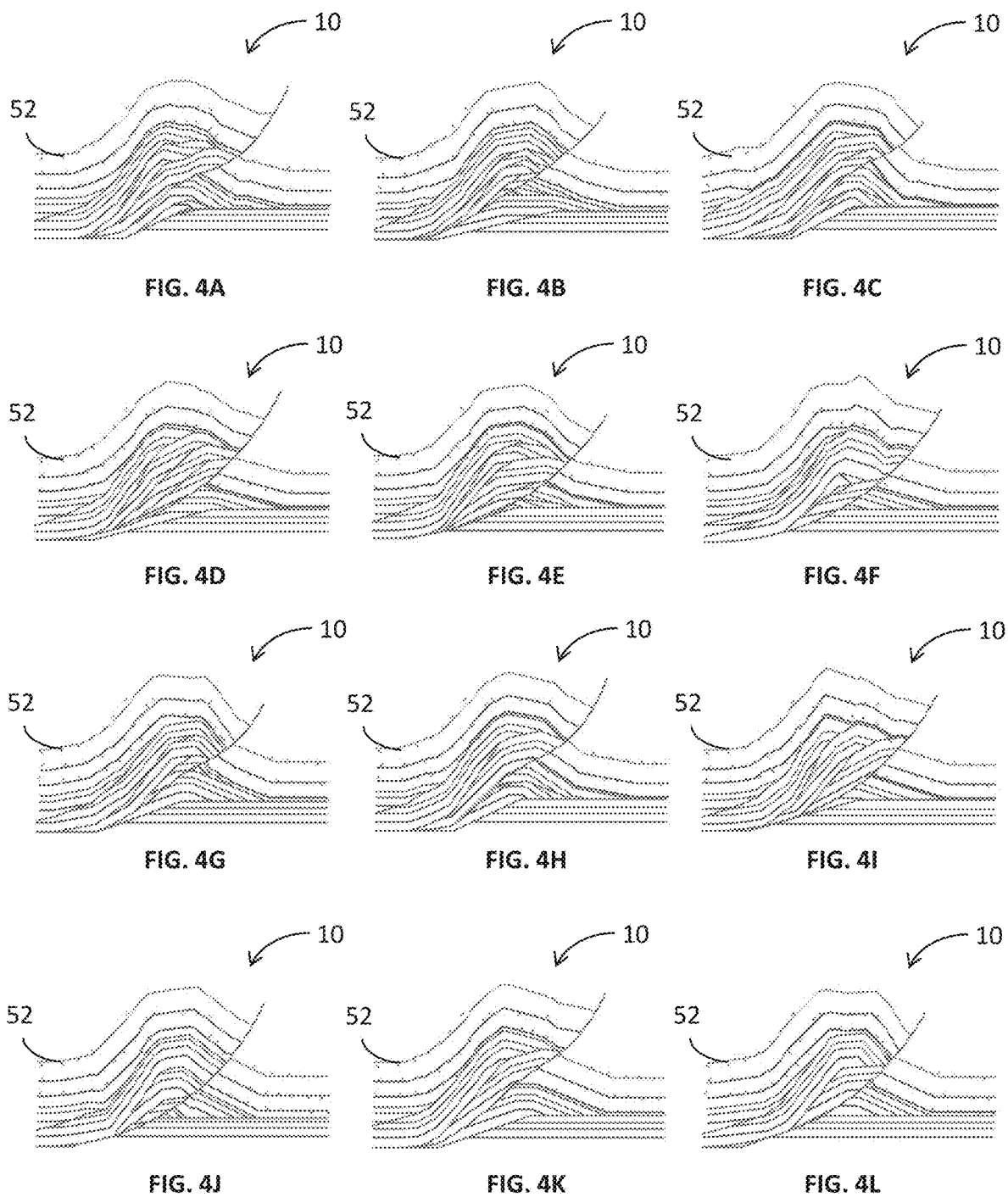
FIGS. 4A-4L illustrates an example of a set of best-fit models produced in accordance with an embodiment of the present invention.

Referring now to FIG. 2, the method of the present invention 10, uses input horizons 12 for a geological setting. The input horizons 12 are interpreted from seismic data for a geological setting, where the seismic data has a well-imaged portion and a poorly imaged portion of the geological setting. A poorly imaged portion of the geological setting is identified for modeling. An example of seismic data 20 for a geological setting is illustrated in FIG. 3. Portions of the seismic data 20 are well-imaged 22, while a portion (generally within the free-form annotation) is poorly imaged 24. The input horizons 12 are picked in high-confidence interpretations from seismic data 30, wells and surface geology. The poorly imaged data 24, such as seismic wipeout zones, may be left uninterpreted and may not be part of the input horizons 12. This is particularly a problem in the case of structurally complex geological settings, as well as areas where environmental factors result in the placement of fewer than preferred number of seismic sources and/or receivers.

In FIG. 2, input parameters 14 are provided. The input parameters 14 are a set of kinematic base model parameters defined by a selected set of geologically valid kinematic base models. The kinematic base models are selected for the geological setting to define a kinematic evolution scenario. Preferably, the kinematic evolution scenario provides a geologically plausible sequence of events and/or episodes for the geological setting. By "geologically valid," we mean that the selected base models and/or the sequence of base models are selected as possible or known geological events and/or episodes for the geological setting of interest.

The set of geologically valid kinematic model parameters may include, without limitation, fault propagation to fault slip ratio, fault slip, fault tip position, fault dip angle, trishear angle, folding zone boundary angles, and combinations thereof. In a preferred embodiment, the input parameters for more complex structures are generated by forward modelling experiments to ensure that the initial parameters yield a roughly reasonable geometry and kinematics.

Kinematic algorithms 16 and optimization routines 18 are connected by objective functions 26. Kinematic algorithms 16 act as the engine conducting the basic tasks, while the optimization routines 18 are the accelerator that makes the tasks run effectively. A computer can rapidly generate as many forward models as desired by executing the kinematic algorithms 16, but, without optimization routines 18, converging on a geologically reasonable model requires repeated manual guidance and tuning.

The computational time required for the method of the present invention is minutes to hours compared with the weeks to months that an industry-standard palinspastic reconstruction typically consumes. The model building process is automatic once the input parameters 14 are set up. In addition, the method can readily test multiple scenarios of structural evolution that may fit the well-imaged data equally.

The kinematic algorithms 16 determine the deformation paths and final geometries of certain basic geological structures, including fault-bend, fault-propagation and detachment folds. These algorithms are expressed as velocity fields fully determined by a set of parameters so that the geometry of a structure over a small time increment is determined by the velocity field and the previous geometry. This ensures that every model output is geometrically and kinematically plausible, and has the benefit of being computationally straightforward and efficient.

The kinematic algorithm 16 is selected by those skilled in the art according to the geological setting and structural style.

The optimization routines 18 are used because a selection of kinematic forward models does not guarantee a model that matches the available data. A brute force approach to model searching may ensure a viable model but it is very inefficient and only works with a small number of variables. For example, a problem with 5 parameters, each of which is evenly divided into 10 parts between the minimum and maximum possible values, means running $10^5=100,000$ models to be able to generate a viable model. In contrast, optimization routines 18 in the method of the present invention 10 enable finding an optimal path to a best-fit solution in the parameter space. Tens of parameters are involved for optimizing a complex geological setting.

A complete structural model with horizons for both the well-imaged and poorly imaged portions of the geological setting is generated based on eth set of kinematic base model parameters.

A particularly advantageous optimization routine 18 is a particle swarm optimization. In a preferred embodiment, a set of geologically valid kinematic model parameters is randomly generated within predetermined geologically valid kinematic model parameter ranges for a predetermined number of seeds.

The seeds are moved around in the parameter space according to local and global best-known solutions. These solutions are updated if better ones are found. During the search process, a gauge is defined to measure the quality of the solutions. A misfit 32, representing a spatial difference between the modelled horizons 34 and the input horizons 12 is used to measure a goodness of fit. The misfit 32 is calculated for each modelled horizon 34 from a predefined objective function 26.

The objective functions 26 pull the modelled horizons 34 generated from kinematic algorithms 16, compute the misfits 32 between the modelled horizons 34 and the input horizon 12 and push the misfits 32 to the optimization routines 18. The next set of candidate solutions 36 is searched using the misfits 32 as guidance. The loop is repeated until a best fit solution 38 is reached. A new set of values for geologically valid kinematic parameters is selected, and the process is repeated to produce a plurality of best-fit models 42 for the geological setting.

As constructing balanced cross sections is an iterative process, only one model can be generated at a time using conventional techniques because its quality needs to be manually analyzed before trying to make the next model. In addition, constructing a model using conventional techniques is labor intensive, even using the semi-automatic workflows in some modelling packages.

Because of the non-uniqueness nature of plausible structural models for a given setting with limited data, the method of the present invention 10 may generate different best-fit models by running a number of realizations with the same kinematic base model parameters in a short period of time. Those models are different from what Brandenburg (discussed above) called a family of solutions. The latter is a result of a single realization, and the models from a family of solutions typically only have subtle differences. However, the best-fit models generated by running a number of realizations in the method of the present invention 10 can be dramatically different, but they all in general have reasonably good fits with the given input data (i.e., input horizons). In addition, different kinematic scenarios can be run in the method of the present invention 10 by modifying the model parameters (both the combinations of kinematic base models and their associated parameters) with the same input horizons 12. These realizations will surely yield different model geometries, but they still have the same level of fit with the input horizons 12. Once generating a plurality of such best-fit models 42 from the same or different kinematic scenarios, those models can be ranked either by misfits or probabilistic density of model geometries/styles or both.

Although the non-uniqueness of balanced cross sections is widely known, teams often face making a business decision based on only one structural model plus some simple uncertainty guesses around this model owing to the time constraints of conventional modelling techniques. The method of the present invention 10 can overcome problem by allowing for testing of multiple scenarios in a reasonable time frame. By generating a range of solutions, a fault position and trap geometry in simple structures or a range of trap scenarios in more complicated structures with multiple detachment levels can be determined.

For a single, simple subsurface structure, the focus of modelling is on predictions for the unknown part of the structure, for example, the exact position and geometry of faults or whether a seismic wipeout zone contains steeply dipping horizons or through-going faults.

In a more complex example, a multistructure section of a geological setting may have structures formed by multiple episodes of faulting and folding activities. The objective in modelling a multistructure section may be quite different from that for a single simple structure. In general, as a section becomes more complex, the degree of uncertainty in an interpretation increases because it is more difficult to constrain the interpretation against the data. Therefore, underpinning the exact geometry and position of the structural elements may not be as important as exploring the structural styles and various scenarios to help determine either the likelihood of the presence of a trap or to provide some constraints on gross rock volume. Evaluating this uncertainty is very difficult using conventional techniques, but much more effective with the method of the present invention.

In accordance with the present invention, risks and surprises may be reduced. By providing a plurality of best-fit models, wells may be planned with a greater sense of what the uncertainties may be, and allows for faster adjustment while drilling, by having access to the various scenarios that may arise.

EXAMPLE

A synthetic section based on a real section across the sub-Andean fold-and-thrust belt was used to demonstrate the method of the present invention. The section is believed to consist of a surface-breaching thrust fault with a target in a deeper duplex structure with an unknown number of thrust sheets (horses) in its core, as depicted in FIG. 4A-4L. The shallow horizons above the upper detachment level are interpretable from the seismic data, whereas the internal geometries of the duplex are virtually completely unconstrained owing to the extremely low quality of the seismic data in that area.

Three horizons, depicted by asterisks 52 at shallow depths were used as the modelling constraints (input horizons); the lowest one being immediately above the upper detachment and considered the structural envelope of the duplex. Note that the three input horizons are discontinuous along the section because of either erosion at the surface or interruption by seismic wipeout zones. Making structural models for this section was primarily a model-driven process given the lack of constraints on the internal geometries of the duplex: the non-uniqueness of solutions was a major structural uncertainty associated with the exploration of this structure.

Multiple scenarios based on varying the number of thrust sheets and the sequences of deformation events were readily tested using the method of the present invention. Twelve models representing various scenarios are shown in FIGS. 4A-4L. In this example, the scenarios tested covered a wide range of possibilities with three to six thrust sheets and surface-breaching thrust faulting occurring either before or after the last thrust sheet (lower-right) formed. The same input horizons (asterisks 52) were applied throughout but, by varying the parameter search range, the method produced different models.

The initial parameter selection was determined by forward modelling experiments to ensure that the initial parameters yield a roughly reasonable geometry and kinematics.

Figure 5:
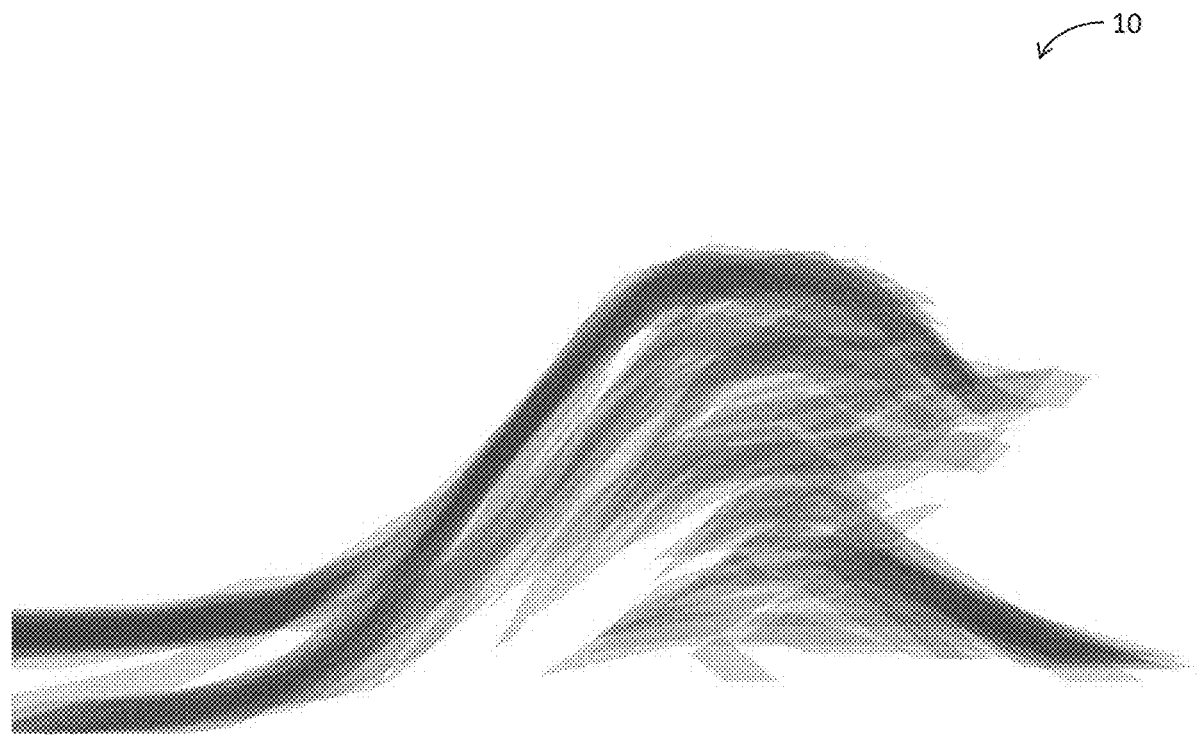
FIG. 5 shows the models of FIGS. 4A-4L overlaid to show spatial trap uncertainty.

The method of the present invention can rapidly produce and test multiple scenarios for multistructure sections, thereby enabling systematic structural uncertainty analysis. The models depicted in FIGS. 4A-4L were then overlaid to show the trap spatial uncertainty (see FIG. 5).

While preferred embodiments of the present invention have been described, it should be understood that various changes, adaptations and modifications can be made therein within the scope of the invention(s) as claimed below.

What is claimed is:

1. A method for generating a plurality of structural models for a geological setting, the method comprising the steps of:
   (a) providing a seismic data set for the geological setting, the data set having a well-imaged portion and a poorly imaged portion;
   (b) identifying a region of the poorly imaged portion of the seismic data set;
   (c) providing input horizons for the well-imaged portion of the seismic data set;
   (d) defining a kinematic evolution scenario by selecting a set of geologically valid kinematic base models;
   (e) defining a set of kinematic base model parameters for the kinematic base models;
   (f) generating a structural model with horizons for the well-imaged portion and the poorly imaged portion of the geological setting based on the set of kinematic base model parameters;
   (g) calculating a misfit between the input horizons and the horizons for the structural model;
   (h) running steps (f) and (g) for a predetermined number of iterations to produce a best-fit model;
   (i) repeating steps (d) to (h) to produce a plurality of best-fit models of geologically plausible solutions for the geological setting; and
   (j) ranking the plurality of best-fit models.

2. The method of claim 1, wherein the set of geologically valid kinematic base model parameters is selected from the group consisting of fault propagation to fault slip ratio, fault slip, fault tip position, fault dip angle, trishear angle, folding zone boundary angles, and combinations thereof.

3. The method of claim 1, wherein the poorly imaged portion is a seismic wipeout zone.

4. The method of claim 1, wherein step (e) further comprises:
   providing a set of geologically valid kinematic base model parameter ranges; and
   randomly generating the set of geologically valid kinematic base model parameters within the geologically valid kinematic base model parameter ranges for a predetermined number of seeds.

5. The method of claim 1, wherein an initial set of values in step (e) are determined by forward modelling experiments to yield the set of geologically valid kinematic base model parameters.

6. The method of claim 1, wherein step (h) is conducted with a particle swarm optimization.

7. The method of claim 1, wherein step (j) is conducted by ranking the misfits, by probabilistic density of model geometries, by probabilistic density of model styles, and combinations thereof.

* * * * *